R. W. BURNETT.
CONVERTIBLE FREIGHT CAR.
APPLICATION FILED MAR. 26, 1917.
1,285,024.
Patented Nov. 19, 1918.
2 SHEETS—SHEET 1.
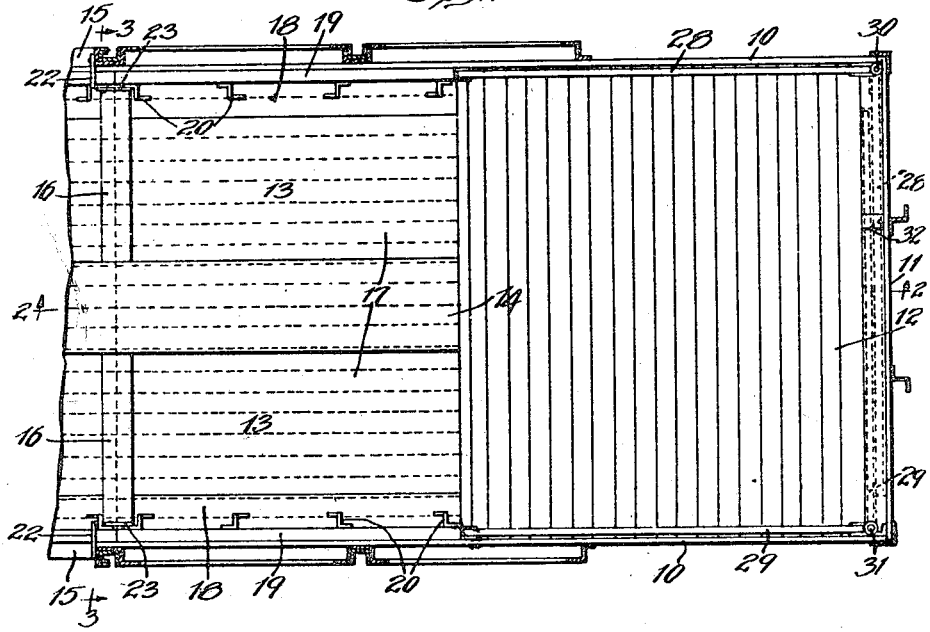
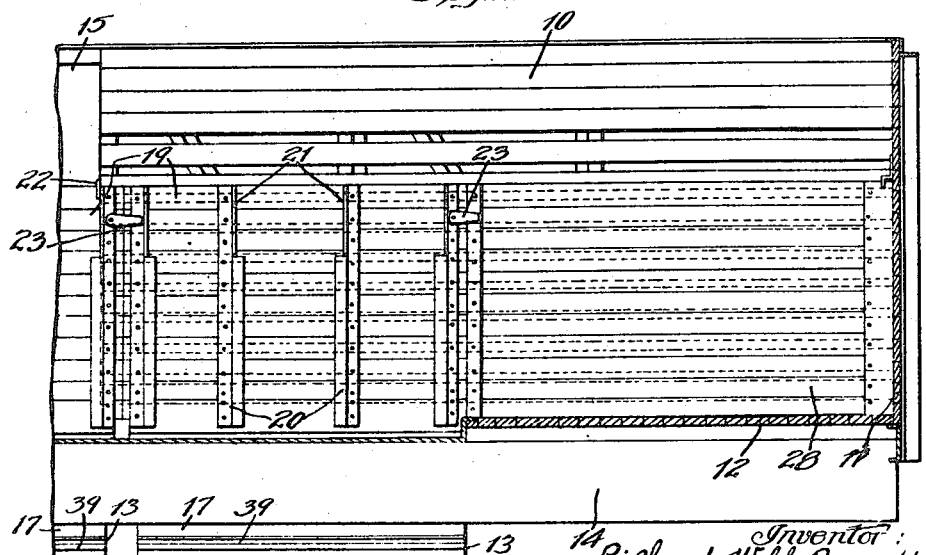
Witnesses:
W. Kilroy
Harry R. L. White
Inventor:
Richard Webb Burnett
By George I. Haight
Attys.

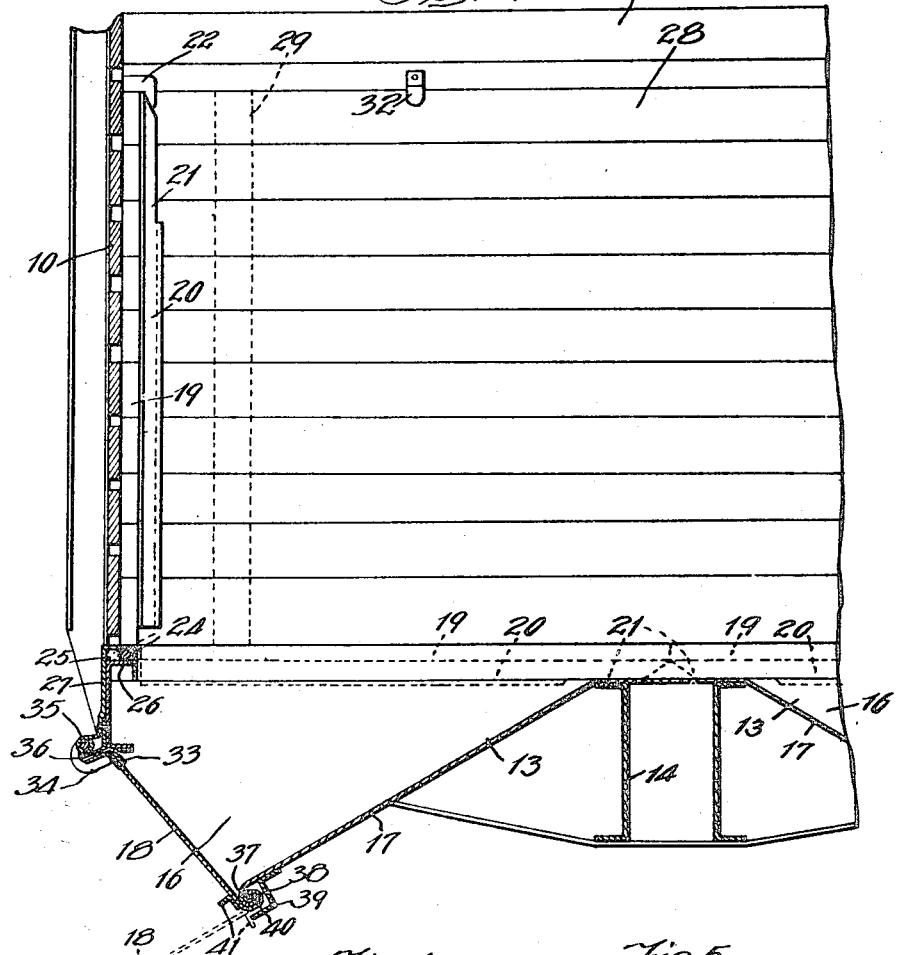

UNITED STATES PATENT OFFICE.

RICHARD WEBB BURNETT, OF CHICAGO, ILLINOIS.

CONVERTIBLE FREIGHT-CAR.

1,285,024.  Specification of Letters Patent.  Patented Nov. 19, 1918.

Application filed March 26, 1917. Serial No. 157,523.

*To all whom it may concern:*

Be it known that I, RICHARD WEBB BURNETT, a citizen of the United States, residing at Chicago, in the county of Cook and State of Illinois, have invented a certain new and useful Improvement in Convertible Freight-Cars, of which the following is a full, clear, concise, and exact description, reference being had to the accompanying drawings, forming a part of this specification.

This invention relates to improvements in convertible freight cars.

As is well known, railroads are always desirous of utilizing their freight cars for carrying freight at all times inasmuch as this results in the most economical operation. Heretofore, where special types of freight cars have been employed, such as stock cars or hopper cars, the railroads have been compelled to run the cars empty in one direction, in many instances, due to the fact that certain freight is only transported in one direction, generally speaking.

The object of my invention is to provide a convertible type of freight car so arranged that it is adapted for transporting either cattle or materials in bulk, such as grain, coal, etc., to the end that the car may be utilized in a productive manner to the maximum extent.

Another and more specific object of the invention, is to provide a convertible stock and hopper car of relatively few parts and minimum dead weight; those parts which are employed to convert the car from one type to another being so disposed as to occupy a minimum amount of space.

The invention furthermore consists in the improvement in the parts and devices and in the novel combination of the parts and devices herein shown, described or claimed.

In the drawing forming a part of this specification, Figure 1 is a horizontal sectional view of a little less than one-half of a car embodying my improvements. Fig. 2 is a longitudinal vertical section of the car illustrated in Fig. 1 and taken substantially on the line 2—2 thereof. In both of Figs. 1 and 2, the full lines indicate the car when it is adapted for carrying material in bulk and the dotted lines indicate the positions of the movable members when the car is adapted for transporting stock. Fig. 3 is an enlarged vertical transverse section of the car taken substantially on the line 3—3 of Fig. 1 and illustrating more particularly the arrangement of hoppers. Fig. 4 is a detail sectional view illustrating the manner of hinging the floor doors. Fig. 5 is a detail sectional view illustrating more particularly the manner of constructing the hopper doors and the joint between the doors and the hopper bottom sheets. And Fig. 6 is a view similar to Fig. 5 illustrating a somewhat different embodiment of the invention.

In said drawing, the car is shown as comprised of open slat side walls 10—10, closed end walls 11, and permanent or fixed floor sections 12 and six hoppers 13—13 arranged between the end floor sections 12. The six hoppers 13 are arranged longitudinally, three on each side of the girder-like center sill 14 and, as will be understood, the central hoppers 13 are disposed opposite the side door openings 15—15 of the car. In Figs. 1 and 2, the position of the usual side doors of the car is shown in part at the left hand end of the figures.

Each of the hoppers 13 is provided with triangular shaped end hopper sheets 16—16 and downwardly inclined hopper bottom sheet 17, the hopper bottom sheets being inclined downwardly and outwardly from the center sill of the car so that the hoppers discharge to the outsides of the rails. Each door opening of each hopper is closed by means of a pivoted sheet metal door 18, the doors being hinged to the hopper bottom sheets in the manner hereinafter described. When the car is employed as a stock car, the floor over the hoppers is formed by means of six pivoted floor doors 19—19, each door fitting over and completely covering its corresponding hopper when the door is in horizontal position, the doors extending from the side wall to the center of the car, as illustrated in the drawing, particularly Figs. 1 and 3. Each of the doors 19 is imperforate and consists preferably of a series of boards reinforced on their under sides by means of Z-bars 20—20. The Z-bars 20 at their inner ends where the same overlap the cover plate of the center sill, have their outermost portion of the Z-flange cut away, as clearly indicated at 21, so that a relatively sharp cutting edge is provided on the Z-bars where the latter overlap the center sill to thus insure the floor doors assuming their correct position and prevent them from being held in an elevated position due to accumulation of dirt or other substance on the center sill.

When the car is employed to carry grain or other material in bulk, it is, of course, necessary to cover over the spaces between the slats forming the side walls of the car. Those portions of the side walls disposed adjacent the hoppers and between the permanent end floor sections 12 are covered by the pivoted floor doors 19 being swung upwardly against the car sides, as clearly indicated in Fig. 3. When swung to such vertical position, the center floor doors 19 which extend across the side door openings of the car, are held by pivoted latches or clips 22. Each of the center floor doors 19 is provided on its opposite edges with pivoted buttons 23 which can be swung to the position most clearly shown in Fig. 2, to thereby overlap the end floor doors 19 and hold the same in elevated vertical position, as will be understood. In order that the floor doors 19, when swung to vertical position, may properly fit against the inner faces of the side walls of the car, each of said floor doors 19 is provided with a slidable hinge connection with the car underframe.

By referring to Fig. 4, it will be seen that each door 19 is provided at its ends with hinge pins 24 which are slidable in horizontally and transversely elongated slots 25 formed between the upper flange 26 of the car side sill and an inverted U-shaped plate 27. The full lines in Fig. 4 indicate the position of the pivot pins 24 when the door is in vertical position, and the dotted lines indicate the position of the pivot pins when the door is in horizontal position. With this arrangement, when the floor doors are in horizontal position, the same extend the entire distance from the center of the car to the outer face of the car side walls.

In addition to covering those portions of the side walls adjacent the hoppers, when the car is carrying material in bulk, it is necessary to cover the end portions of the side walls which are adjacent the end floor sections 12 of the car. This is accomplished at each end of the car by a pair of partitions 28 and 29. These partitions 28 and 29 are pivotally mounted so as to swing about vertical axes in the corner of the car, the door 28 being pivotally mounted, as indicated at 30, in the extreme corner so that when the door 28 is swung transversely of the car it will fit directly against the end wall 11; and the other partition 29 is pivoted as indicated at 31 at a distance from the end wall of the car corresponding to the thickness of the other partition 28. In this connection, it will be understood that the length of the side walls of the car which are to be covered by the partitions 28 and 29 correspond to the width of the car. The full lines in Fig. 1 indicate the partitions 28 and 29 as covering said portions of the side walls of the car, and the dotted lines indicate the position of said partitions when not in use and overlapping each other adjacent the end wall of the car. In the latter position, the partitions 28 and 29 reinforce the end walls and may be held by any suitable means, such as pivoted clips 32, as shown in Fig. 3.

With the foregoing arrangement, it is apparent that a minimum number of parts is employed for converting the car to either type and the end partitions 28 and 29 can readily be positioned out of the way when the car is employed for transporting stock and without substantially diminishing the interior length of the car.

Referring now more particularly to Figs. 3 and 5, it will be noted that the side sills of the car have secured to their lower flange an angle-bar 33 bent to a wedge shape and against which the upper edges of the hopper doors abut when the latter are in closed position. To hold the hopper doors 18 in closed position any suitable mechanism may be employed, preferably a series of hook-shaped presser fingers 34 mounted on a longitudinally extending rocking shaft 35, the latter being operated at its end by any suitable means.

In order to provide a water-shed for the joint between the hopper doors and the side sills of the car, each of the side sills has secured along its outer lower edge, an angle-bar 36, as shown in Fig. 3, so that rain is shed over the upper edges of the hopper doors.

To form a grain seal between the hopper doors and the hopper bottom sheets, each of the latter is provided at its lower outer portion with a curled edge 37 and the corresponding hopper door is provided with a coöperating curled edge 38, the curled edges 37 and 38 interlocking to form a hinge joint and a grain seal. To reinforce the hopper bottom sheets, longitudinally extending Z-bars 39 are secured to the under faces thereof, each of the Z-bars 39 not only strengthening the hopper bottom sheets but forming a backing for the hinge joint to prevent accidental separation thereof and also, the lower flange 40 of each Z-bar forms a shelf or support for the hopper door when the latter is in open position. Each hopper door is also reinforced along its hinged edge by means of an angle-bar 41 secured thereto by riveting or otherwise, as shown in Fig. 5.

In the construction illustrated in Fig. 6, instead of curling the lower edge of the hopper door, I may attach a separate member 141, the latter having a curled edge 138 coöperating with the curled edge 137 of the hopper bottom sheet and an angularly disposed strengthening flange 50.

I have herein shown and described what I now consider the preferred means of carrying out the invention, but the same is merely illustrative, and I contemplate all changes and modifications that come within the scope of the claims appended hereto.

I claim:

1. A convertible car of the character described having stock car open sides, end walls, fixed end floor sections, intermediate floor sections adapted to be positioned either horizontally to form that portion of the floor between the end floor sections or vertically against the car sides to cover the latter, and means for covering the end portions of the side walls adjacent the said end floor sections, said means comprising shiftable partitions adapted to occupy either a position against said end portions of the side walls or parallel to the end walls of the car.

2. A convertible car of the character described having stock car open sides, end walls, fixed end floor sections, intermediate floor sections adapted to be positioned either horizontally to form that portion of the floor between the end floor sections or vertically against the car sides to cover the latter, and means for covering the end portions of the side walls adjacent the said end floor sections, said means comprising a pair of pivoted partitions at each end of the car, the partitions being adapted to be positioned against said end portions of the side walls or parallel to the end walls of the car.

3. A convertible car of the character described having stock car open sides, end walls, fixed end floor sections, intermediate floor sections adapted to be positioned either horizontally to form that portion of the floor between the end floor sections or vertically against the car sides to cover the latter, and means for covering the end portions of the side walls adjacent the said end floor sections, said means comprising at each end of the car, a pair of partitions, each partition being pivoted to swing about a vertical axis substantially in the corner of the car, the partitions being arranged to overlap each other when swung against the end walls of the car.

4. A convertible car of the character described, and having stock car open sides, end walls, fixed end floor sections, hoppers intermediate said end floor sections, pivoted floor doors adapted to be positioned to either cover said hoppers or cover the adjacent portions of the car sides, and means for covering the end portions of the car sides adjacent said end floor sections, said means comprising shiftable partitions adapted to occupy either a position against the end portions of said car sides or parallel to the end walls of the car.

5. A convertible car of the character described, and having stock car open sides, end walls, fixed end floor sections, hoppers intermediate said end floor sections, pivoted floor doors adapted to be positioned to either cover said hoppers or cover the adjacent portions of the car sides, and means for covering the end portions of the car sides adjacent said end floor sections, said means comprising shiftable partitions adapted to occupy either a position against the end portions of said car sides or parallel to the end walls of the car, said partitions being pivotally mounted to swing about vertical axes substantially in the corners of the car.

6. In a car, the combination with a car body having walls and hoppers, of floor doors pivoted along their edges and adapted to swing to either horizontal position to cover the hoppers or vertical position to cover the car walls, each of said doors being provided with laterally extended pivot pins, and the car being provided with corresponding elongated slots within which said pivot pins are slidable, said elongated slots being formed by metal elements of the car structure.

7. In a car of the character described, the combination with a car body having hoppers, each having a downwardly inclined hopper bottom sheet, of a pivoted door for each of the hoppers, and means for pivotally connecting each door with its corresponding bottom hopper sheet, said means comprising interlocking curled edges on the hopper bottom sheet and door, and a longitudinally extending strengthening flange on each door on the under side thereof adjacent its curled edge.

8. In a car of the character described, the combination with a car body having hoppers, each hopper including a downwardly inclined metal hopper sheet, of doors for each of the hoppers, means for pivotally connecting each door with its corresponding hopper bottom sheet, said means including an integral curled edge on the hopper bottom sheet and an integral curled edge on the door, Z-bars extending longitudinally of the hopper bottom sheets adjacent the pivotal connections, and angle-irons secured to the under sides of the hopper doors adjacent the curled edges thereof.

9. A convertible stock and hopper car, said car having stock car open side walls, end walls, fixed end floor sections, hoppers intermediate said end floor sections, floor doors adapted to occupy either a horizontal position over the hoppers or a vertical position against the side walls of the car, slidable pivotal connections between said floor doors and the car underframe, pivoted partitions at the ends of the car, each partition being pivoted substantially in the corner of the car, and pivoted doors for each of the hoppers.

10. In a car of the character described, the combination with a car body having hoppers, each hopper including a downwardly inclined metal hopper sheet, of doors for each of said hoppers, means for pivotally connecting each door with its corresponding hopper bottom sheet, said means including integral curled edges on the hopper bottom sheet and door, and Z-bars extending longitudinally of the hopper bottom sheets adjacent the pivotal connections arranged to form a bracing support for the doors.

11. In a car of the character described, the combination with a car body having hoppers, each hopper including a downwardly inclined metal hopper sheet, of doors for each of the hoppers, means for pivotally connecting each door with its corresponding hopper bottom sheet, said means including interengaging curled edges on the hopper bottom sheet and door, and an angle iron secured to the under side of each of the hopper doors adjacent said curled edges.

In witness that I claim the foregoing I have hereunto subscribed my name this 5th day of March, 1917.

RICHARD WEBB BURNETT.